Nov. 27, 1934.    L. D. HESS ET AL    1,982,102
CONVEYER SYSTEM
Filed Sept. 28, 1929    3 Sheets-Sheet 1
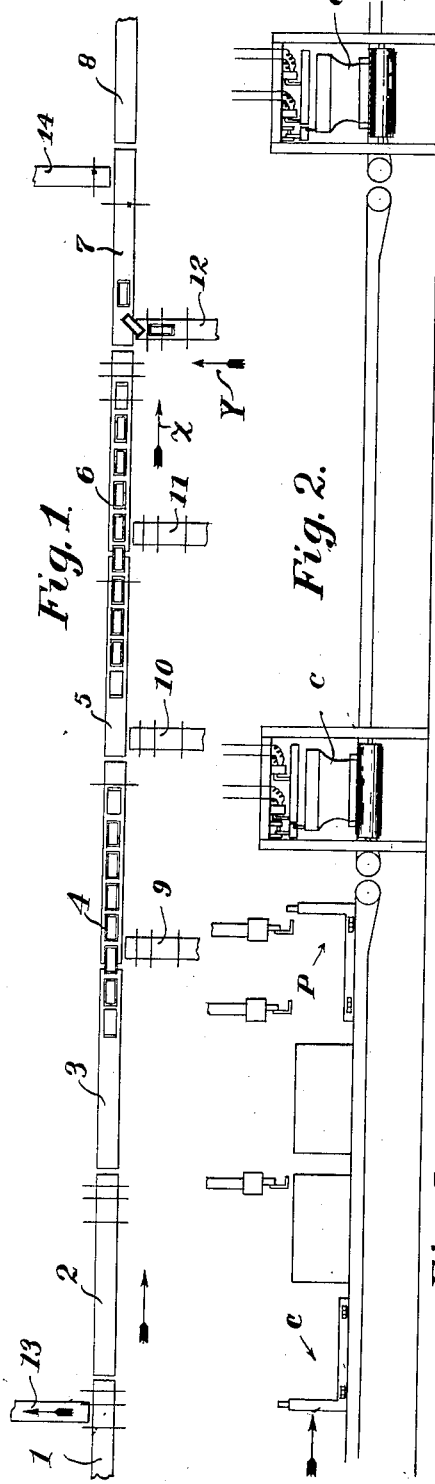
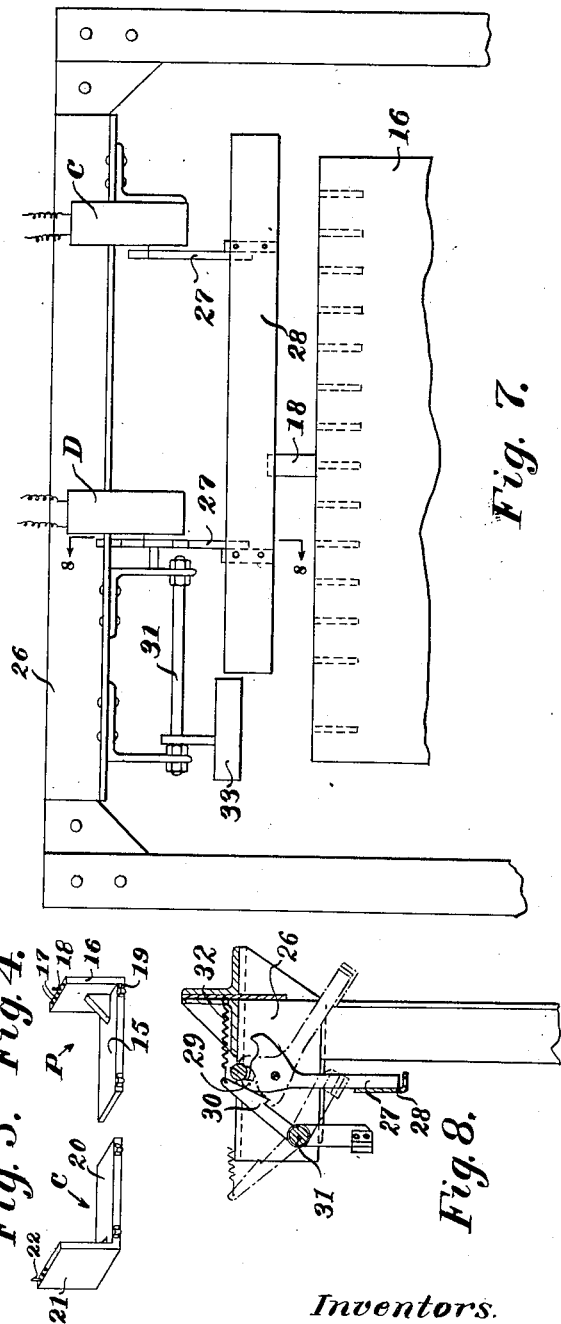
Inventors.
Lloyd D. Hess.
Charles Robert Libby.
by Roberts Cushman Woodberry
Attys.

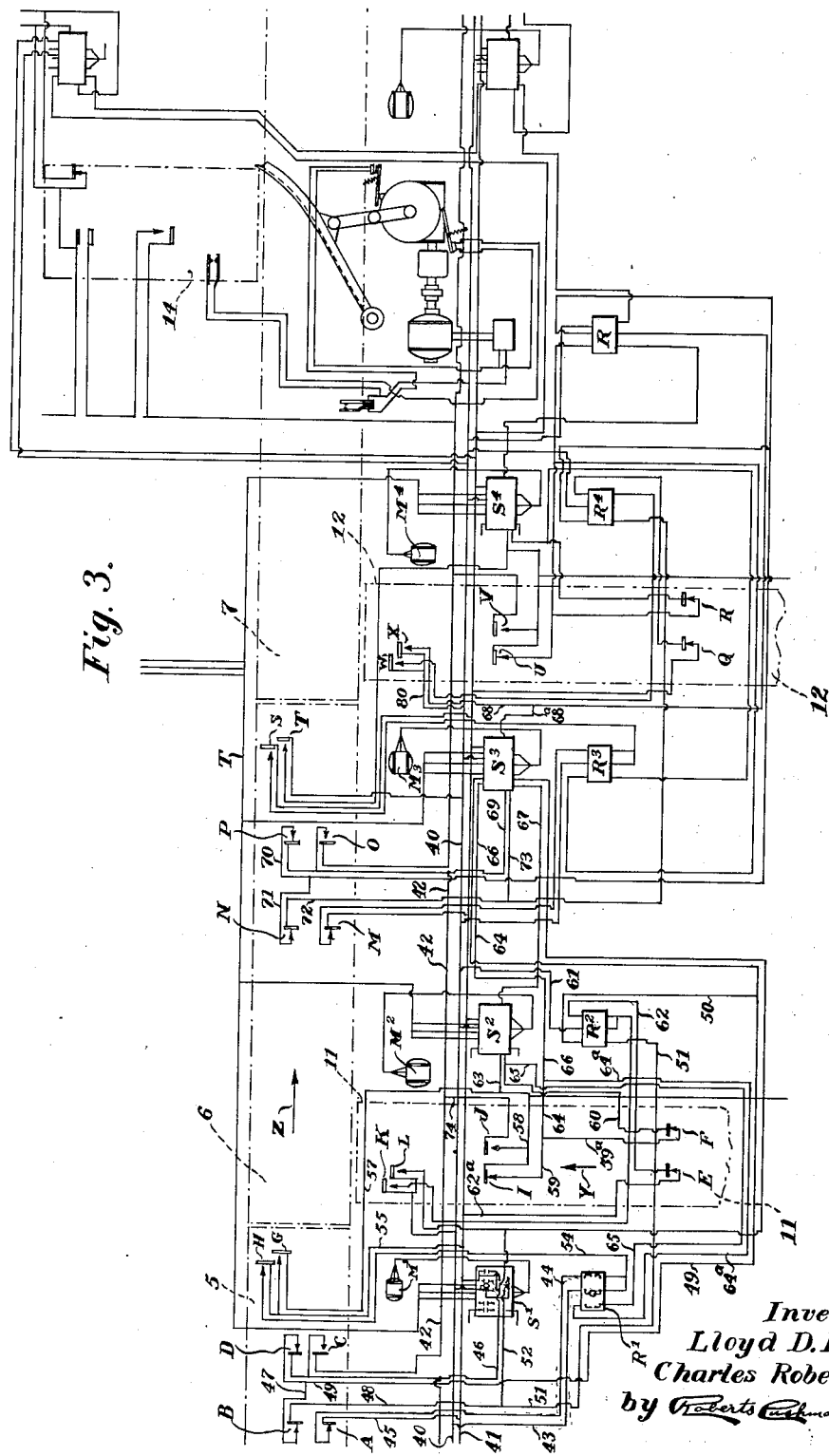

Nov. 27, 1934.  L. D. HESS ET AL  1,982,102
CONVEYER SYSTEM
Filed Sept. 28, 1929  3 Sheets-Sheet 3
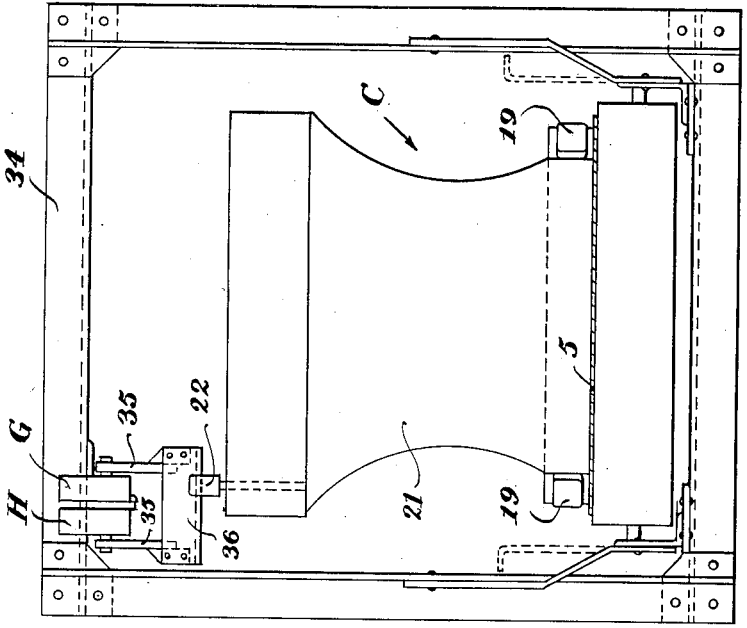
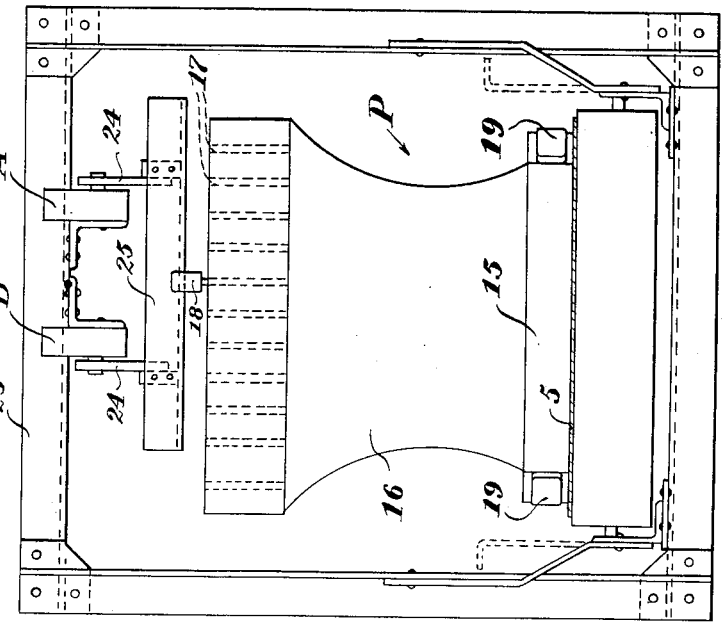
Inventors.
Lloyd D. Hess,
Robert C. Libby.
by Roberts Cushman Woodbury Attys.

Patented Nov. 27, 1934

1,982,102

UNITED STATES PATENT OFFICE 1,982,102

CONVEYER SYSTEM

Lloyd D. Hess and Charles Robert Libby, Syracuse, N. Y., assignors to The Lamson Company, Syracuse, N. Y., a corporation of Massachusetts Application September 28, 1929, Serial No. 395,931

31 Claims. (Cl. 198—21)

This invention pertains to conveyer apparatus wherein material of various kinds such, for example, as bundles, packages, boxes, carriers, or cars, in which articles may be placed, or loose material, for example, scrap rubber, cloth, leather or the like, is caused to move along a predetermined path with or without the employment of power actuated impelling means such, for instance, as endless belts, driving rolls, air currents, etc. and wherein a plurality of conveyer tracks as, for example, a main track and a feeder track converge to a junction point. For convenience in further description, but without intention of limiting the invention, we will make reference to a system or apparatus wherein endless conveyer belts constitute the impelling means and shall use the term "load unit" as expressive of any object, segregated mass of material, carrier, car, article or series of such objects, cars, or articles constituting a complete individual charge for delivery to or from the apparatus. We will also employ the term "way" as indicating any predetermined path along which load units move, whether by gravity, momentum, or power actuated impelling means and for convenience we may refer to a "main" way and a "feeder" way as indicating respectively a trunk line along which a relatively large number of load units move and a branch line delivering to the trunk line at any desired point, it being evident that both the main and feeder ways may in turn constitute portions of a larger system in which the main way will deliver to another conveyer or conveyers and wherein the feeder may receive load units from subsidiary feeders.

In a system of the type referred to, wherein it is desired to move load units in orderly succession along a main conveyer way and wherein load units are also delivered to said main way at spaced points by feeder conveyers, difficulty has been experienced through interference between load units moving along the main way and units delivered or about to be delivered to the main way by a branch or feeder. While in a short and simple system such interference may be of little importance and readily corrected (when it occurs) by an attendant, it becomes a serious matter in the long and complex automatic systems at present employed in many industrial plants wherein junctions between main lines and feeders are often at considerable distances apart and in many cases accessible only with difficulty.

In accordance with the present invention we provide automatic interlocking control means for the several belts constituting the impelling means of the system so as to avoid possibility of interference between the load units at the junction points. To this end we divide the several conveyer ways into sections each comprising a single belt, and drive each belt section independently as, for example, by means of an independent electric motor. Through appropriate means we then automatically control the stopping and starting of each independent belt section. While the control means for determining the operation of the several belt sections might be made responsive to index devices mounted directly upon the article which is to be transported as, for example, when such article is a box, car, or carrier of a definite predetermined shape, we prefer to provide pilot and caboose cars which may be placed at any desired distance apart upon the conveyer belt and between which the articles or material to be transported are placed, the pilot and caboose with the interposed articles or material constituting the load unit. When using such an arrangement it is convenient to mount the index elements (which through suitable mechanism hereafter more fully described determine the actuation of the control means) upon the pilot and caboose cars respectively. It is to be noted that the pilot car constitutes the extreme forward end of the load unit while the caboose forms the extreme rear end of the load unit.

As thus arranged, when a load unit approaches a junction point, the index elements upon the pilot car and caboose engage certain contact elements which in turn determine the operation of the belt driving means and if desired, switching devices. As herein specifically disclosed the controlling means is so arranged that if load units simultaneously approach a junction point along the main and feeder way respectively, the load unit which first approaches the junction ordinarily has the right of way and accordingly the drive for the other conveyer is temporarily stopped until the first load unit has safely passed the junction. Furthermore, in order to avoid congestion of load units upon a conveyer section which has been stopped, provision is made to stop the further delivery of load units to such stopped conveyer as, for example, by stopping a preceding belt section of the feeder conveyer, but in the latter case such preceding section is not stopped until it is just about to deliver a load unit to the section which is already at rest. Moreover, in order to prevent a given load unit from waiting indefinitely upon a stopped conveyer at a junction as, for example, by reason of the frequency with which load units arrive upon the other conveyer, the present invention provides for alternate stopping and starting of conveyers converging to a junction, provided that each conveyer has a load unit ready for delivery, and thus a load unit upon one conveyer will be required to wait only until a single load unit on the other conveyer has passed the junction.

In the accompanying drawings we have illustrated one embodiment of our invention wherein the load units are moved by endless conveyer belts, each belt being driven by an independent electric motor and having an exemplary arrangement of electric circuits for controlling the several motors but with the understanding that the illustrated arrangement represents a preferred but not necessarily the only mode of obtaining the desired result.

In the drawings:

Fig. 1 is a diagrammatic plan view, to small scale, showing a portion of a main or trunk conveyer together with certain branch conveyers leading to and from the main conveyer;

Fig. 2 is a diagrammatic side elevation, to larger scale than Fig. 1, showing portions of three consecutive sections of the main conveyer, with a load unit on one section, and also portions of two branch or feeder conveyers, and control mechanism associated therewith;

Fig. 3 is a plan view to larger scale than Fig. 1, consisting essentially of a wiring diagram indicating the connections between the several electrical switches and actuating devices and indicating certain auxiliary details of a complete system;

Figs. 4 and 5 are perspective views illustrating a pilot car and caboose, respectively, adapted to form the leading and trailing elements of a load unit;

Fig. 6 is a fragmentary front elevation (partly in vertical section) to larger scale illustrating a pair of circuit breaking switches and the means for supporting the same for actuation by index elements on the pilot car;

Fig. 7 is a fragmentary elevation illustrating an associated circuit breaking and a circuit making or closing switch, with the means for supporting them for actuation by index elements on the pilot car and caboose respectively;

Fig. 8 is a fragmentary vertical section substantially on the line 8—8 of Fig. 7; and Fig. 9 is a view similar to Fig. 7 but illustrating associated circuit making switches and the means for supporting them for actuation by index elements carried by the caboose.

As herein illustrated (Fig. 1) the conveyer system comprises a main or trunk line consisting of a series of endless belts 1, 2, 3, 4, 5, 6, 7, 8, etc., here shown as arranged in horizontal alignment (although they may be otherwise arranged), and adapted to deliver articles or materials from one to another successively. The system also comprises conveyer lines herein shown as endless belts 9, 10, 11, 12, etc., adapted to feed or deliver articles or material to the belts constituting the main or trunk line. Other belts, illustrated at 13 and 14 for example, may be arranged to receive articles or material from the main or trunk line.

The several belts forming the system may be supported in any suitable manner, as for example upon idler rolls not shown, and such belts as are to receive positive driving motion pass around driving rollers actuated by electric motors M1, M2, M3, M4, (Fig. 3) etc., preferably through the interposition of reduction gearing. The electric current for driving the several motors is supplied from a main line T (Fig. 3) preferably carrying three phase current, and this current is fed to the several motors by means of corresponding starters S1, S2, S3, S4, etc. These starters are primarily under the control of relay devices R1, R2, R3, R4 of magnetic type and of any proper and usual construction.

As typical of suitable controlling means for determining the starting and stopping of the belts adjacent to any given junction point, we have illustrated such controlling means as arranged at the junctions of the belts 6 and 11, and 7 and 12 respectively, such means being adapted to control the operation of the motors M1, M2, M3 and M4. To illustrate certain permissive features of the invention we have also shown additional connections and circuit controlling devices, and it will be understood that the controlling features as just referred to will be provided at each junction point along the main conveyer or at junctions of the branch conveyers with subsidiary conveyers.

Considering now the particular junction points above referred to, we arrange a pair of circuit breakers A and B near the delivery end of the belt 5. Beyond these circuit breakers A and B, in the direction of movement of the load unit, we arrange another circuit breaker D and a circuit closer or maker C. Further on, and still nearer to the delivery end of the belt, we arrange a pair of circuit closers or makers G and H.

Near the end of the conveyer belt 11 we provide a similar set of circuit breakers and closers E, F; I, J; K, L; respectively. The several circuit breakers and closers may be of any desirable type and are adapted, as hereinafter more fully explained, to be actuated by index elements, such, for example, as pins carried by the pilot car and caboose comprised in each load unit, it being assumed that the load units move in the direction of the arrows Z and Y in Figs. 1 and 3.

At the next juncture point, where belt 12 approaches belt 7, sets of circuit makers and breakers M, N; O, P; S, T; ... Q, R; U, V; W, X; respectively are provided, and a similar arrangement will be employed at each successive junction.

Referring to Figs. 2, 4, and 5, the pilot car P, when employed with a belt conveyer, may conveniently consist of a horizontal base member 15 supporting an upright 16, the latter preferably being provided with a plurality of sockets 17 for selective reception of index elements such as the pins 18. While the pin and socket type of index element is convenient and desirable from the standpoint of simplicity, other and equivalent index devices may obviously be employed. If desired, the base member 15 may be provided with lateral brackets carrying anti-friction rollers 19 for contact with such guides, switch devices, or the like as may be comprised in the system.

The caboose C may conveniently be similar to the pilot car, having the base member 20 and the upright 21 which is adapted to carry suitable index elements 22.

In Fig. 6 we have illustrated one desirable arrangement for supporting and actuating circuit breakers such as A, B or E, F. Thus, at the proper point longitudinally of the belt 5, I provide an upright frame having a horizontal cross-rail 23, spaced vertically from the belt and carrying the circuit breakers A and B. These circuit breakers may be of any usual type, each having an actuating arm 24, said arms being secured to a contact member 25. This contact member is spaced from the belt at such a distance that as the pilot car P passes beneath it an index element 18 carried by the car will strike the contact member 25 and swing the latter from its normal position, thus momentarily breaking the circuits controlled by the circuit breaking switches A and B. As illustrated, the contact member 25 is of such length transversely of the belt that index elements at any part of the pilot car, except at its extreme left hand side (as viewed in Fig. 6) will engage the member 25 and actuate the switches A and B.

In Figs. 7 and 8, we have illustrated an arrangement for supporting and actuating associated circuit making and breaking switches, such as C, D. Thus in these figures a supporting frame arranged at the proper point includes the horizontal cross-rail 26 which carries the normally open circuit making switch C and the normally closed circuit breaking switch D. These switches have actuating arms 27 secured to a contact bar 28 extending transversely above the belt at such a height as to be engaged and actuated by index elements 18 carried by the upright 16 of the pilot car, the contact 28 being of such length as to be engaged by index elements at any point on the member 16, except at its extreme left hand end (as viewed in Fig. 7).

Referring to Fig. 8, one of the arms 27 is furnished at its upper end with a detent or catch 29 which is adapted to engage a holding latch 30 when the contact member 28 is swung to the dotted line position of Fig. 8. This latch 30 is mounted upon a shaft 31 and is normally held in position to be engaged by the detent 29 by a spring 32. The shaft 31 has fixed thereto a short contact member 33 arranged above the left hand portion of the conveyer belt (as viewed in Fig. 7) and to one side of and preferably in advance of the contact member 28. This contact 31 is disposed at the proper height for engagement and actuation by an index element at the left hand side of the caboose, and when swung to the dotted line position of Fig. 8 releases the latch 30 from the detent 29, allowing the contact 28 to return by gravity (or, if preferred, through the actuation of a spring) to normal position, thereby restoring the switches C and D to normal position.

Referring to Fig. 9 we have illustrated means for supporting and actuating associated circuit making switches such as G and H. Thus at the proper location we arrange a frame carrying the horizontal crossbar 34 upon which the circuit making switches H and G are mounted, preferably above the left hand side of the belt (as viewed in Fig. 9). These switches have depending actuating arms 35 attached to a contact bar 36 adapted to be moved by index elements carried by a caboose traveling along on a belt, and when so moved the contact member momentarily closes the normally open switches H and G.

Without previous detailed description of the wiring connections, we will proceed with a description of the operation of the several devices, indicating the several electrical circuits by reference characters applied to the conductors illustrated in the wiring diagram of Fig. 3.

Assuming that all of the conveyers are running and that a load unit comprising a pilot car and caboose is moving along on the conveyer belt 5 toward the junction of the latter with the belt 6, and that no load unit is near enough on feeder belt 11 to interfere with it, the index element or pin on the pilot car of the load unit on belt 5 engages the contact member 25 and swings the latter as the load passes beneath it, thus momentarily opening the normally closed switches A and B. When the switch A is opened it breaks the circuit comprising the feed wire 40, wire 43, the retaining magnet of relay R1, the wire 44, the switch A, the wire 45 and feed wire 41. This momentary breaking of the circuit deenergizes the holding magnet of relay R1, thus breaking the circuit controlled by said magnet, and this circuit remains broken (although switch A closes immediately after passage of the pilot car) until closed by a pin upon the caboose as hereinafter described.

When switch B is actuated it momentarily breaks the circuit comprising the wire 41, starter S1, wire 46, switch D, wire 47, switch B, wires 48 and 52, the holding magnet of starter S1, and wire 40. However, as switch B is in parallel with relay R2 through the circuit including wire 41, starter S1, wire 46, switch D, wires 49 and 50, relay R2, wires 51 and 52, starter S1, and wire 40, the momentary breaking of the current at switch B does not affect the starter S1 or the motor M1 controlled by it, so that the belt 5 is kept running.

As the pilot car continues to advance along conveyer 5 its index element engages the contact member 28 and thereby actuates the circuit making and breaking switches C and D respectively which are held in their new position, as the pilot car proceeds, by the latch 30. When the switch D is actuated as just described, it breaks the normally closed circuit including wire 41, starter S1, wire 46, switch D, wire 47, switch B, wires 48 and 52, holding magnet of starter S1, and wire 40. This circuit remains broken until the index element on the caboose engages contact 33 and releases latch 30, but the operation of motor starter S1 is not affected so long as relay R2 remains closed. The function of switch C is more fully described hereinafter.

When the caboose at the rear end of the load unit nears the end of conveyer 5, its index element engages the contact 36 and closes the normally open switches G and H. The switch H completes a circuit including wire 40, wire 43, relay R1, wire 54, switch H, wire 55 and wire 41, thus re-establishing the circuit controlled by the magnet of relay R1 which was previously broken by the operation of switch A. When the switch G is closed it completes a circuit comprising wire 41, wire 55, switch G, wires 57, 58, switch I, wires 59 and 59a, switch F, wire 60, starter S2 and wire 40. The operation of switch G thus closes the circuit through the starter S2 which controls the driving motor M2 for conveyer 11, if for any reason such circuit had previously been broken. The load unit now passes from the conveyer 5 to the conveyer 6 and past the junction of conveyer 11 with the latter, and the parts thus being restored to the original condition, all of the conveyers continue to run.

Assuming now that load units on conveyers 5 and 11 are simultaneously approaching the junction of conveyers 6 and 11, but that the load unit on conveyer 5 is slightly nearer the junction and has the right of way, it becomes necessary to stop conveyer 11 to prevent interference of the load units at the junction point.

As the load unit on conveyer 5 approaches the junction, the index element upon its pilot car actuates switches A and B as above described, it being remembered that the momentary actuation of switch A breaks the circuit controlled by relay R', and that although switches A and B close immediately after passage of the pilot car, this relay circuit remains open until the caboose passes switch H.

Now when the index on the pilot car of the load unit on conveyer 11 engages the actuating contact of switches E and F, it momentarily operates them in the same way as switches A and B were operated by the load on conveyer 5. The operation of switch E breaks the circuit including wire 40, wire 61, the holding magnet of relay R2, wire 62, switch E and wires 62a and 41, thus de-energizing the magnet of relay R2 and breaking the circuit controlled thereby until such circuit is later closed independently of the operation of switch E. The circuit comprising wire 41, starter S2, wires 63 and 58, switch I, wires 59, 64 and 64a, relay R', wire 65, holding magnet of starter S2, and wire 40 connects the starter S2 and the relay R' in parallel, but as the caboose upon the load unit on conveyer 5 has not yet closed switch H this circuit is still open at the relay R'.

When the switch F is actuated, it momentarily breaks the circuit comprising wire 41, starter S2, wire 63, wire 58, switch I, wires 59 and 59a, switch F, wire 60, holding magnet of starter S2, and wire 40. The circuit through the starter S2 thus being broken, the motor M2 stops and conveyer 11 comes to rest.

As the load unit on conveyer 5 passes onto conveyer 6 it is necessary to restart conveyer 11. Thus when the index pin on the caboose of the load unit on conveyer 5 engages the contact 33, it releases switches C and D, the latter closing a circuit including wire 41, starter S', wire 46, switch D, wire 47, switch B, wires 48 and 52, the magnet of starter S', and wire 40. As the caboose continues, its index element actuates the switch H, as above described, and also closes the circuit including wire 41, wire 55, switch G, wires 57 and 58, switch I, wires 59 and 59a, switch F, wire 60, starter S2 and wire 40, thus causing the starter S2 to close the circuit through motor M2, starting the latter and again setting the conveyer 11 into motion.

The above sequence of operations occurs whenever a load unit on a section of the main conveyer has precedence over a load unit on a feeder conveyer. Obviously a complementary set of operations takes place, involving the same controlling devices and circuits, whenever a load unit on a feeder conveyer takes precedence over a load unit on a main conveyer.

As previously pointed out it is desirable, not only to stop a conveyer whose load unit would interfere with another at a junction point, but also to stop any conveyers precedent to the stopped conveyer before they can deliver their loads onto the stopped conveyer, so as to avoid congestion at any point in the system. Thus, for example, assuming that a load unit on the feeder conveyer belt 12 has the right of way over the load unit on conveyer 6, and that the holding circuit through starter S3 has been broken and the motor M3 has stopped, it becomes necessary to stop conveyers 5 and 11 as soon as loads upon either of these latter conveyers approach their junctions with the stopped conveyer 6, or to stop these conveyers 5 and 11 simultaneously with the stopping of conveyer 6 in the event that load units on the conveyer 6 overlap or extend part way onto the conveyers 5 or 11.

Thus assuming a load unit on conveyer 6 overlapping onto conveyer 11, the switch I (associated with conveyer 11) will have previously been opened by the pilot car of the load unit on the conveyer 11, but the caboose of such load unit will not as yet have closed it. Therefore with both the switch I and the circuit through starter S3 open, the circuit through wire 40, starter S2, wire 60, switch F, wires 59a, 64, and 66, starter S3, wire 67, starter S2, and wire 41 will be broken, thus stopping conveyer 11 simultaneously with conveyer 6.

In the event, however, that the caboose of the load unit on conveyer 11 has already passed and closed switch I, then the circuit through the starter S2 will be maintained through wire 41, starter S2, wires 63 and 58, switch I, wires 59 and 59a, switch F, wire 60, starter S2, and wire 40.

The same general conditions apply to all following conveyers, that is whenever the circuit through a given starter is broken, one circuit through the starter of the conveyer immediately preceding is also broken through the first-mentioned starter, but the second starter is also controlled by the pilot car and caboose of the interfering load unit.

Obviously after preceding conveyers have been stopped as above described, it becomes necessary to start them again after the load unit having the right of way has passed the junction point. Circuit closing switch C and corresponding switches J, O, V, etc. are provided with this operation in view. Thus for example after the caboose on conveyer 12 has passed onto conveyer 7 and closed the switch X, the conveyer 6 is started through the closure of the circuit including wire 41, wire 80, switch X, wires 68, 68a, wire 69, switch P, wires 70 and 71, switch N, wires 72 and 73, starter S3, and wire 40. The closing of starter S3 starts the conveyer 11, which is controlled by the starter S2, through the circuit including wire 41, starter S3, wire 69, wire 42, wire 74, switch J, wires 58, and 63, starter S2, wire 67, starter S3, wires 66 and 64, wire 59a, switch F, wire 60, starter S2, and wire 40, thus starting up again any conveyers that may have been stopped by the pilot car but not yet released by the passing of the caboose.

While we have described above by way of example certain situations with respect to interfering load units, it is to be understood that other combinations than those described may arise but that in any case the circuits and controlling devices as above outlined cooperate to prevent interference of load units at junction points or the congestion of load units at any point in the system. It is further to be understood that the system herein described may be combined with any desired forms of diverting switches for unloading load units from one conveyer section onto another and that any desired forms of signal devices as well as manual controlling means may be employed in connection with the system to adapt it for use in any particular location or situation, and that while the particular circuits disclosed are desirable, other and equivalent circuits may well be substituted therefor.

We claim:

1. Conveyer apparatus having a way along which load units may move, means for moving said units along the way, means associated with said way for controlling the operation of said moving means, and front and rear actuator members carried by said unit and adapted successively to actuate said controlling means.

2. Conveyer apparatus having a way along which load units may move, means for moving said units along the way, movable control means associated with the way for controlling the operation of said moving means and front and rear actuator members carried by each load unit and relatively adjustable to a predetermined distance apart longitudinally of the way which members have operative engagement with said control means as the load unit moves along the way.

3. Conveyer apparatus having ways converging to a junction point, means for moving load units along each way toward the junction point, a front and a rear actuator member carried by each unit, means acted upon and responsive to the conjoint action of the front actuator members of load units upon both of said ways for stopping the load moving means of one of the ways, and means acted upon by and responsive to the rear actuator member of the load unit upon the way, the load moving means of which is not stopped, for restarting the stopped load moving means.

4. In a conveyer apparatus having a way, movable control means associated therewith, a pilot car movable along the way, a caboose, independent of the pilot car, also movable along the way, said pilot car and caboose being adapted to receive between them a predetermined quantity of material to be conveyed, the pilot car, load and caboose thus constituting a load unit of which the pilot car and caboose form the front and rear ends and which is moved as a unit along the way past said control means, and an actuator member carried by one of said ends for operatively contacting with the control means.

5. In a conveyer apparatus having a way, movable control means associated therewith, a pilot car movable along the way, a caboose, independent of the pilot car, also movable along the way, said pilot car and caboose being adapted to receive between them a predetermined quantity of material to be conveyed, the pilot car, load and caboose thus constituting a load unit of which the pilot car and caboose form the front and rear ends and which is moved as a unit along the way past said control means, and actuator members carried by each end of the load unit for operatively contacting with the control means.

6. In a conveyer apparatus having a way, a pilot car and a caboose movable along the way and adapted for spacing apart to any desired distance to receive between them a load, and control members associated with the way, the pilot car and caboose each including a base member and an upright member, the upright members having sockets for index pins which contact with certain of said control members.

7. Conveyer apparatus having a way along which load units each comprising a pilot car, a load and a caboose may move, means for moving the units along the way, movable control means associated with the way, the pilot car and caboose of each unit being provided with an actuator member adapted for operative engagement with the control means, said pilot car and caboose being relatively movable lengthwise of the way to accommodate variable amounts of material between them and said load units being moved as such past said control means.

8. A conveyer system having a way comprising a plurality of sections along which load units may move successively, means for moving the units along the way sections, means for stopping a load unit moving along one of said sections, and means automatically operative to stop any load unit upon a preceding section which is about to be delivered to a section upon which a load unit has been stopped.

9. A conveyer system having a way comprising a plurality of conveyer belts arranged in succession, independent drive means for the several belts, and means automatically operative, upon stoppage of one of said belts, to stop any preceding belt whenever a load unit carried thereby is about to be delivered to a belt which has stopped.

10. Conveyer apparatus having a pair of ways converging toward a junction, and means, automatically and successively operated by the load units upon the respective ways as they near the junction, to give the right of way past the junction to that load unit upon either way which is first in approaching the junction.

11. Conveyer apparatus comprising a pair of ways converging toward a junction point, means for moving load units along each way toward the junction point, and means successively operated by the load units upon their approach to the junction point of a load unit upon either way to stop the means for moving a load unit upon the other way only in case that unit nearly approaches the junction.

12. Conveyer apparatus having a main way and a feeder way, said ways converging to a junction, independent drive means for moving articles along the respective ways toward the junction, and means automatically and successively actuated by the article moving along one way, one of which means acts to stop the article driving means of the other way when articles approach the junction simultaneously along both ways whereby to prevent interference of the articles at the junction, and another of which means acts to cause the stopped article driving means to resume operation after the article on the first way has passed the junction.

13. Conveyer apparatus having a pair of conveyer belts converging toward a junction point and adapted to transport load units, independent drive means for the respective belts, controlling means automatically and successively operated by the load units, said controlling means acting when load units approach the junction point along both belts to stop the drive means of the belt transporting the unit which is further from the junction point, whereby to prevent interference of load units at the junction point.

14. Conveyer apparatus having a pair of ways converging to a junction, independent drive means for moving trains of load units along the respective ways toward the junction, and controlling means automatically operative, when trains of load units upon the respective ways are simultaneously near the junction, to stop the driving means of one way until the first load unit of the train upon the other way has passed the junction, said controlling means being so constructed and arranged as to allow said drive means to resume operation as soon as a single load unit from the other way has passed the junction.

15. Conveyer apparatus comprising a pair of conveyer belts converging toward a junction point, independent means for driving the belts, and interdependent control means comprising a starting and stopping device for each drive means and elements associated with each belt and adapted to be successively actuated by load units nearing the junction point to move from a normal to an abnormal position, said elements, when concomitantly abnormally positioned, causing the starting and stopping device of that belt whose load unit is further from the junction point to stop its drive means, the device of the other belt being unaffected.

16. Conveyer apparatus comprising a pair of conveyer belts, one belt being arranged to deliver load units to the other, independent drive means for the respective belts, means operative under certain conditions to stop the receiving belt and means operative after stoppage of the receiving belt to stop the delivering belt only when a load unit upon the latter nears the point of delivery to the receiving belt.

17. Conveyer apparatus having a main way and a feeder way, said ways converging to a junction, means for delivering articles to each of said ways, independent drive means for moving articles along the respective ways toward the junction, means automatically operative to stop the article driving means of one way when articles approach the junction simultaneously along both ways, and means to suspend the delivery of articles to that way whose article drive means has been stopped.

18. Conveyer apparatus having a main way and a feeder way converging to a junction, each way comprising a plurality of independent sections along which articles move toward the junction, means automatically operative, when articles upon the respective ways simultaneously near the junction, to stop the article on one of the ways before it reaches the junction whereby to prevent interference of the articles at the junction, and means operative to prevent delivery of articles from a preceding section of the way to that section upon which the article has been stopped which means act only when such delivery is imminent.

19. Conveyer apparatus having a main way and a feeder way, said ways converging to a junction, means for delivering articles to each of said ways, the articles moving along the latter toward the junction, means automatically operative, when articles upon the respective ways simultaneously near the junction, to stop the article upon one of the ways whereby to prevent interference of the articles at the junction, and means operative to suspend the action of the delivery means by which articles are fed to that way upon which the article has been stopped.

20. Conveyer apparatus having a pair of ways converging toward a junction, each way comprising a plurality of sections along which load units move successively toward the junction each section having independent drive means for moving the load units, and control means automatically operative, when load units moving along the respective ways simultaneously approach the junction, to stop the drive means for that section of one way immediately preceding the junction point, and means to suspend delivery of load units to that section of the way whose drive means has been stopped.

21. Conveyer apparatus having a pair of conveyer belts converging toward a junction point, independent drive means for the two belts, means for delivering load units to the respective belts, means automatically operative to stop one of the belts when articles approach the junction point simultaneously upon both belts, and means to suspend the operation of the means by which load units are delivered to the belt which is stopped.

22. Conveyer apparatus having a pair of ways converging toward a junction point, each way comprising a plurality of conveyer belts arranged to deliver load units in succession from one to another, independent means for driving each belt, and control means automatically operative, when load units moving along the respective ways simultaneously approach the junction point, to stop that belt whose load is nearest the junction point, and means operative to stop any preceding belt which is about to deliver a load unit to a belt which has stopped.

23. Conveyer apparatus comprising a pair of conveyer belts converging toward a junction point, each belt being adapted to move load units of different lengths toward the junction point, means responsive to that load unit which is first to near the junction point to stop a load unit on the other belt before it reaches the junction point, and means responsive to the passage of the junction by the rear end of the first load unit, regardless of its length, to restart the second load unit.

24. In combination with a main conveyer way and a feeder way converging to a junction point with the main way, means for causing load units each comprising a pilot car and a caboose to travel along each way, means actuable by the conjoint action of the pilot cars of two load units converging toward a junction point to give one of said load units the right of way, and means actuable by the caboose of the latter unit, as said unit passes the junction, to give the load unit upon the other way the right of way.

25. Conveyer apparatus comprising a pair of ways converging toward a junction point, means for causing load units to travel along each way, and means to prevent interference of load units approaching the junction, said means comprising actuator members adjacent to the leading and trailing ends respectively of each load unit, contact means associated with each way adjacent to the junction point and adapted to control the operation of the means causing units to travel along the other way, and means operable by engagement of the forward actuator member upon a load unit with the contact means associated with its way, to stop the operation of the means causing the travel of a load unit upon the other way, and operable by the engagement of the rear actuator member with the contact means to permit such means to resume operation.

26. Conveyer apparatus having a pair of ways converging toward a junction, and means automatically operative, when load units upon the respective ways simultaneously approach the junction, to give the right of way past the junction to a load unit on one way while stopping the load unit on the other way, said means being so constructed and arranged that load units approaching the junction upon the respective ways shall have the right of way alternately.

27. Conveyer apparatus comprising a pair of conveyer ways converging toward a junction point, and means constructed and arranged to stop a load unit on one way as it approaches the junction to prevent interference between such load unit and a load unit on the other way also approaching the junction, said stopping means being constructed and arranged to delay the stopped load unit only until a single load unit on the other way has passed the junction, regardless of the number of load units upon said other way which may be moving toward the junction.

28. Conveyer apparatus having a pair of ways converging to a junction, independent drive means for moving load units along the respective ways toward the junction, and controlling means automatically operative, when load units upon the respective ways simultaneously near the junction, to stop the driving means of one way until the load unit upon the other way has passed the junction, said controlling means being so constructed and arranged that a load unit stopped at the junction awaiting the passage of a load unit on the other way shall take precedence over a second load unit approaching the junction along said latter way.

29. Conveyer apparatus comprising a pair of conveyer belts converging toward a junction point, an electric motor for driving each belt, a starter for each motor, a relay device for each starter, means actuable by load units nearing the junction along each belt to break a circuit through the corresponding relay, and connections between the several relays and starter such that concomitant breakage of both relay circuits causes the stoppage of that motor only corresponding to the last relay to be actuated.

30. Conveyer apparatus comprising a pair of conveyer belts converging toward a junction point, an electric motor for driving each belt, a starter for each motor, a relay device for each starter, means actuable by load units nearing the junction along each belt to break a circuit through the corresponding relay, electrical connections between the several parts so arranged that concomitant breakage of both relay currents causes the stoppage of that motor which corresponds to the last relay to be actuated, and means responsive to continued movement of a load unit upon the still moving belt to reestablish the circuit through its corresponding relay.

31. Conveyer apparatus comprising a pair of conveyer belts converging toward a junction point, an electric motor for driving each belt, a motor starter for starting and stopping each motor, a load unit upon each belt, each load unit having a front and a rear actuator member, contacts spaced longitudinally of each belt for successive engagement by the front and rear actuator members, and electrical connections between the several contacts and the respective motor starters such that engagement of the front actuator member of a load unit on one belt with a contact associated with its belt after the front actuator member of a load unit on the other belt has engaged its corresponding contact and before the rear actuator member of the last load unit has engaged its corresponding contacts, will stop the motor for the first belt.

LLOYD D. HESS.
CHARLES ROBERT LIBBY.